Feb. 13, 1968   F. R. PFLEDERER   3,368,708
FILAMENT WOUND TANK DESIGN
Filed July 28, 1966
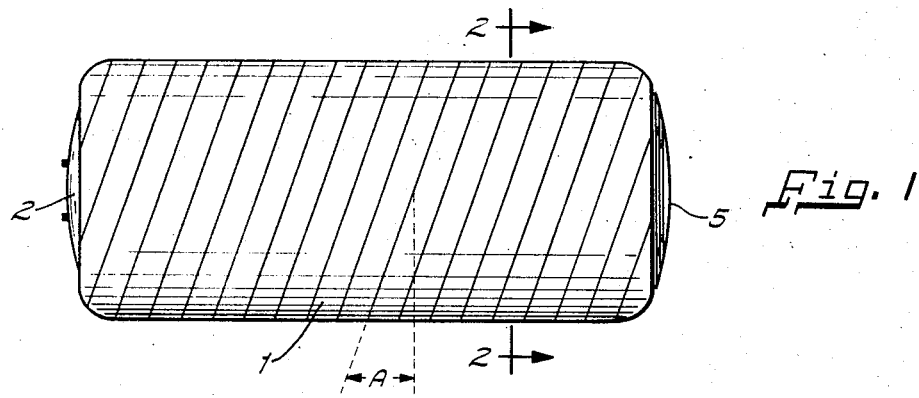
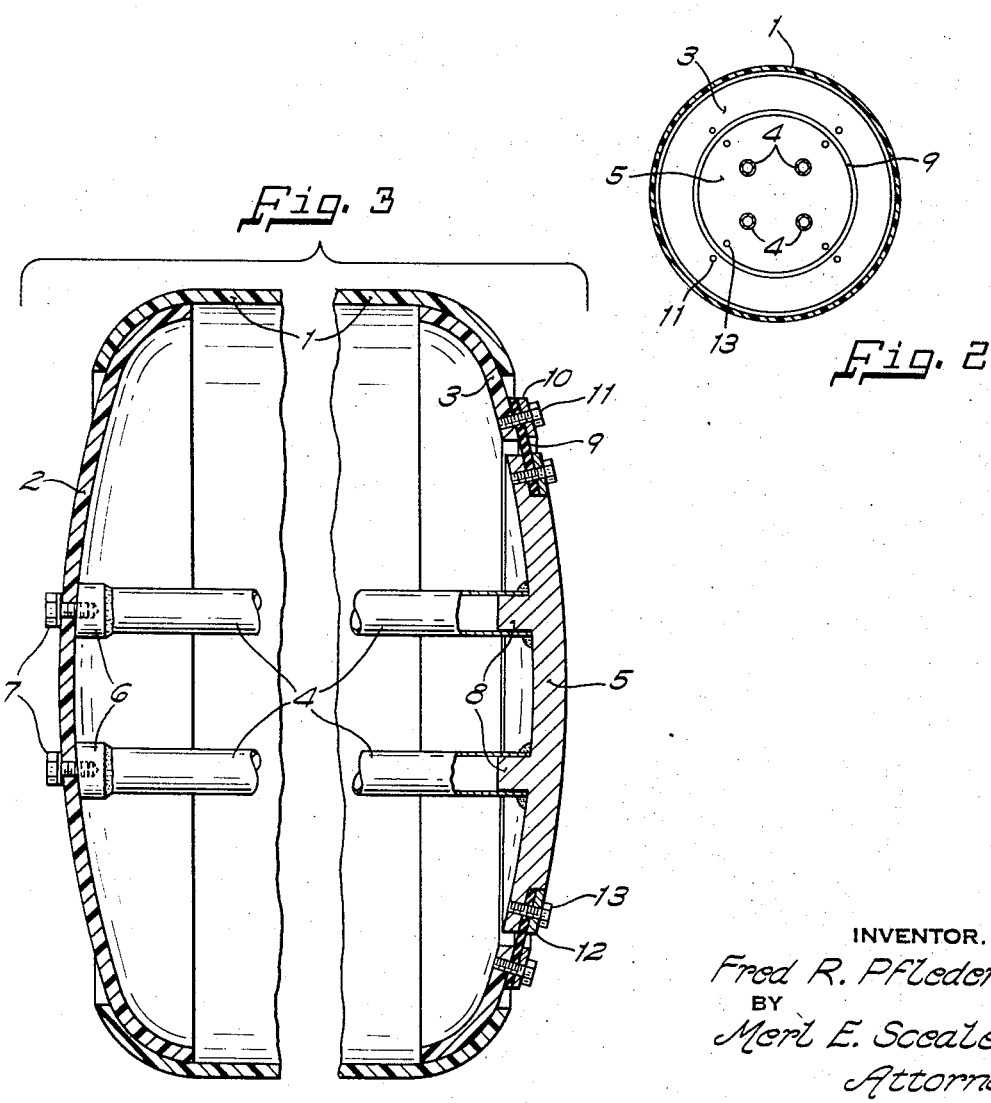
INVENTOR.
Fred R. Pflederer
BY
Merl E. Scoales
Attorney United States Patent Office 3,368,708
Patented Feb. 13, 1968

3,368,708
FILAMENT WOUND TANK DESIGN
Fred R. Pflederer, Little Rock, Ark., assignor, by mesne assignments, to A. O. Smith Corporation, Milwaukee, Wis., a corporation of New York
Filed July 28, 1966, Ser. No. 568,451
8 Claims. (Cl. 220—3)

This invention relates to a filament wound vessel and more particularly to a filament wound vessel having a wall stress condition capable of withstanding higher internal pressures without weeping.

Filament wound vessels are generally fabricated by helically winding a strand of fibrous material impregnated with a thermosetting resin about a cylindrical mandrel in a number of superimposed layers. The cylindrical wall section of a vessel is normally designed for a 2/1 ratio of hoop stress to axial stress and in most cases the winding pattern used to meet this stress ratio places ⅔ the filaments in the hoop direction and ⅓ the filaments in the axial direction. In other cases, the fibrous material is wound at 35¼° helix angle in alternate right hand and left hand helixes with respect to a transverse plane extending through the vessel. Both of these winding patterns have been established so the fibrous reinforcement is loaded in pure tension under the 2/1 stress ratio they are designed for.

When a filament wound vessel is subjected to internal pressure, a tensile stress occurs at the interface between the resin and the fibrous reinforcing material. When the bond between the resin and fiber fractures, weeping will occur through the vessel wall.

It has been found that the bond tensile stress at the resin-reinforcement interface is a function of the elastic properties of the resin and reinforcement, the percent of reinforcement in the wall, the orientation of the reinforcement, the magnitude of the average hoop stress, and the stress ratio imposed on the wall. This invention reduces the axial load imposed on the cylindrical wall section thereby changing the biaxial stress condition in the wall from the normal 2/1 to a higher value in the range of 5/1 to 8/1 which requires a much higher hoop stress to create a fracture of the resin-reinforcement interfacial bond. Optimum performance will result when the wall of the filament wound vessel is wound at helix angles in the range of 24° to 19½° to match the stress ratio condition of 5/1 to 8/1, respectively. A vessel so wound will be capable of withstanding much higher internal pressures without weeping, thereby permitting the use of a reduced wall thickness with an associated reduced cost and giving this concept an economic advantage.

The present invention is directed to a filament wound vessel having a wall stress condition which will substantially reduce the bond tensile stress under given load conditions to thereby minimize weeping failure. More specifically, the cylindrical wall of the vessel is formed of superimposed layers of helically wound fibers bonded with a thermosetting resin. The fibers are wound at a low helix angle to accommodate a hoop-to-axial stress ratio in the neighborhood of 5/1 to 8/1. To obtain this condition in the wall, a portion of the axial load is taken by one or more longitudinal tie rods secured to one fixed head of the vessel and the opposite ends of the tie rods secured to a floating member which is located within an opening in the opposite head. The floating member is a central circular section of the opposite head which is connected to the remaining annular portion of the head by a flexible seal which permits relative motion between the circular floating member which is connected to the tie rod rods and the annular portion of the head which is connected to the cylindrical wall section. When the vessel is subjected to internal pressure, the cylindrical wall will expand radially due to the hoop stress and the radial expansion will tend to shorten the axial length of the vessel. The pressure exerted against the annular section of the head will be imposed as an axial stress in the cylindrical wall and with the conditions set forth in this invention this axial stress will only partially offset the axial shortening of the vessel due to hoop stress, with the result that the annular head section and the opposite head will move towards each other. The pressure acting against the circular floating head section will create a tensile stress in the tie rods with the result being that the floating member and the opposite head will move away from each other so that a relative movement occurs between the floating member and the annular portion of that head.

By using the longitudinal tie rods which are connected between the fixed head and the floating member, the wall of the vessel will contain a high hoop-to-axial stress ratio and filament winding can be designed for this vessel with a given wall thickness which will minimize the glass-resin bond stress to resist weeping under high internal pressure. Thus, the wall thickness can be reduced while obtaining high internal pressure loading. By reducing the wall thickness of the filament wound vessel, the overall cost of fabricating the vessel is correspondingly reduced.

Other objects and advantages will appear in the course of the following description.

FIGURE 1 is a longitudinal view of the filament wound vessel of the invention;

FIG. 2 is a transverse section taken along line 2—2 of FIG. 1; and

FIG. 3 is an enlarged fragmentary longitudinal section showing the attachment of the floating disc to the head of the vessel.

The drawings illustrate a filament wound vessel including a generally cylindrical wall or shell 1 having one end enclosed by a head 2 and the opposite end partially enclosed by a head 3. The cylindrical wall 1 is formed of helically wound, fibrous material impregnated with a thermosetting resin which serves to bond the fibers together as an integral structure. The cylindrical wall is normally fabricated by helically winding a strand of fibrous material impregnated with a thermosetting resin about a cylindrical mandrel in a number of superimposed layers. The fibrous strand is generally formed of substantially continuous, unidirectionally fibers or filaments, but in some cases the strand can be composed of woven fabric, braiding, or the like. The particular type of fibrous material used as the reinforcement for the vessel is not critical and can take the form of mineral fibers, such as glass or asbestos; synthetic fibers, such as nylon, rayon, Dacron or Orlon; vegetable fibers, such as cotton; animal fibers, such as wool; metal fibers, such as steel wire; or the like.

The resin used as the binder for the fibrous reinforcing material in fabricating the vessel can be any conventional thermosetting resin used in the fabrication of filament wound vessels. The resin may take the form of epoxy resins, polyester resins, urea-formaldehyde resin and the like. It has been found that epoxy resins prepared in accordance with the method set forth in Patent 2,801,227 are particularly satisfactory as a binding material.

The curved heads 2 and 3 are formed separately from the cylindrical wall 1 and form the ends of the mandrel on which wall 1 is wound. The fibrous strand used in winding the wall 1, is wound over the edges of the heads 2 and 3 and the thermosetting resin used as a binder in the filament wound wall adheres to the heads and serves to secure the heads in place.

The heads 2 and 3 may be formed by filament winding, compression molding, vacuum bag molding or the like. In most instances, the resin used in fabricating the heads will be the same as is in the wall 1; however, since the subject invention is directed at increasing the material performance in the cylindrical wall section only, any conventional head material may be used as long as at least one head has a floating disc member with a seal which permits relative motion between the floating member and head, as will be more fully described.

The wall of a cylindrical vessel is generally loaded with a 2/1 ratio of hoop stress to axial stress because the cylindrical wall carries the full axial load created by the internal pressure. However, according to the subject invention the stress ratio in the wall can be changed by using a series of tie rods 4 which are connected between head 2 and a floating, disc-shaped member 5 located within a central opening in head 3. One end of each of the tie rods 4 is provided with a solid flange 6 which is connected by bolt 7 to the head 2 of the vessel. The opposite end of each of the tie rods 4 is bonded around a stud 8 which extends outwardly from floating member 5 located within the opening in the head 3 of the vessel. The tie rods 4 may be made of filament wound material or compression molded material, or in some cases, can be metal such as steel or aluminum.

Head 3 and disc 5 must be connected with a seal 9 which will contain internal pressure and yet be flexible to permit relative motion between the head and the disc. One such method of achieving this is to clamp a flexible metal or plastic ring 9 between the members. To connect the seal 9 between disc 5 and head 3, the outer edge of the annular seal is secured to the head 3 by a ring 10 and bolts 11, while the inner edge of the seal is located within a recess formed in the disc 5 and retained in the recess by a ring 12 which is secured to the disc by a series of bolts 13.

The tie rods 4 connected to disc-shaped floating member 5 will be loaded in axial tension due to the internal pressure exerting an axial force on member 5. The axial tension carried by the tie rods will reduce the axial stress carried in the cylindrical wall giving the wall a high hoop-to-axial stress. The diameter of the floating member is between 70% and 87% of the diameter of the cylindrical wall diameter which creates hoop-to-axial stress ratios between 5/1 and 8/1 in the cylindrical wall. This high stress ratio in the wall allows filament wound material to withstand much higher hoop stress loads without breaking the resin-glass bond. Optimum performance will result when the filaments in wall 1 are wound in right and left hand helixes at angles of from 24° to 19½° with respect to the transverse plane, and these angles are compatible with hoop-to-axial stress ratios in the cylindrical wall of from 5/1 to 8/1.

It has been found that the increased ratio between hoop stress to axial stress substantially reduces the bond stress between the fibers and the resin, thereby reducing the possibility of fracture along the interface and the resulting weeping. A substantial portion of the axial forces developed by internal pressure is resisted by the floating disc 5 which is connected to head 2 by tie rods 4. When the vessel is subjected to internal pressure, the pressure acting in a radial direction will tend to expand the cylindrical wall 1 and the head 3 will tend to move in a direction toward the head 2. The axial force developed by the internal pressure will bear against the head 2 and against the head 3 as well as the movable disc 5. The axial forces tend to elongate the tie rods 4 which in turn tend to move the disc 5 in a direction away from the head 2. Thus, the disc 5 and the head 3 will tend to move in opposite directions when the vessel is subjected to internal pressure and the flexible seal 9 enables the elements to move relative to each other.

There is a relationship between the area of the disc 5 and the annular area of the head 3 which is dependent upon the hoop-to-axial stress ratio desired. If, for example, a 22° helix angle of winding is used which would correspond to about a 6:1 hoop-to-axial stress ratio, the area of the disc 5 should be approximately ⅔ of the total area of the head, whereas the area of the annulus would be ⅓ of the total area. While the area of the disc 8 should generally increase with respect to the total area of the end of the vessel as the hoop-to-axial stress ratio is increased, the precise figure can vary depending on the length of the vessel. With a vessel of short axial length, an end effect is present due to the cup-like bend where the head joins the cylindrical wall, preventing hoop growth due to hoop stress. The bend serves as a flange to increase rigidity so that the effect of the hoop stress is not as apparent in a vessel of short length as in one which is of longer axial length. Thus, the relationship between the hoop-to-axial stress and the area of the disc 5 with relation to the overall cross sectional area of the cylindrical wall can vary depending on the length of the cylindrical wall section 1. For most applications, however, the area of disc 5 should be at least 50% of the cross sectional area of the cylindrical wall section.

While the above description has shown a series of tie rods 4 which are located inside of the vessel, it is contemplated that a single tie rod may be employed if it extends axially of the vessel. Similarly, the tie rods 4 may be located on the outside of the vessel rather than inside as long as they are concentric of the vessel so that no bending will occur.

In addition, it is contemplated that a floating head member or disc 5 may be employed at each end of the vessel rather than a single floating head member at one end, as shown in the drawings. The use of two floating discs would in most instances increase the cost of fabrication so that it is preferred only to use a single floating end member or disc 5.

The filament wound vessel of the invention is designed with a stress wall condition capable of withstanding higher internal pressures without weeping. The use of the high hoop-to-axial stress ratio reduces weeping failure and thereby enables a thinner wall section to be employed for a given bond strength. A portion of the axial component of internal pressure is taken up by the floating disc 5 and tie rods 4 which are connected to the fixed head 2. Thus, the cylindrical wall carries a reduced axial load while maintaining its normal hoop stress condition.

The filament wound vessel of the invention is particularly adaptable for high pressure vessels or for large diameter, moderate pressure cylinders.

Various embodiments of the invention may be employed within the scope of the following claims.

I claim:

1. A filament wound vessel, comprising a cylindrical wall section having a hoop-to-axial stress ratio in the range of 5:1 to 8:1 and composed of a helically wound fibrous strand bonded with a thermosetting resin, a head connected to one end of the cylindrical wall section, an annular head section connected to the opposite end of the cylindrical wall section and having an opening, a member disposed within the opening, flexible sealing means for sealing the space between said member and said head section to permit relative movement between said member and said head section, and rigid connecting means secured between said head and said member, the radial component of the internal pressure within said vessel tending to expand said cylindrical wall section radially and move said head and said head section toward each other and a portion of the axial component of said internal pressure tending to move said member in a direction away from said head to thereby resist the axial pressure.

2. The vessel of claim 1 in which the fibrous strand is wound at a helix angle in the range of 19½° to 24° with respect to a transverse plane extending through said cylindrical wall.

3. The vessel of claim 1 in which said rigid connecting means consists of at least one rod-like member disposed axially of said cylindrical wall.

4. The vessel of claim 1 in which said rigid connecting means consists of a series of rod-like members disposed concentrically with respect to the axis of said cylindrical wall.

5. The vessel of claim 4 in which the rod-like members are disposed within the cylindrical wall.

6. The vessel of claim 1 in which the area of said member is at least 50% of the cross sectional area of said cylindrical wall section.

7. The vessel of claim 1, in which the diameter of said member is 70 to 87% of the diameter of the cylindrical wall.

8. The vessel of claim 1, in which the member is located concentrically of the cylindrical wall and the sealing means is annular in shape.

References Cited

UNITED STATES PATENTS

| 3,104,026 | 9/1963 | Turner | 220—46 XR |
| 3,172,252 | 3/1965 | Boek | 60—35.6 |

FOREIGN PATENTS 119,372   10/1918   Great Britain.

RAPHAEL H. SCHWARTZ, *Primary Examiner.*